(12) United States Patent
Suzuki

(10) Patent No.: US 8,428,117 B2
(45) Date of Patent: Apr. 23, 2013

(54) IMAGE ENCODER AND IMAGE ENCODING METHOD

(75) Inventor: Koichi Suzuki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1303 days.

(21) Appl. No.: 11/084,011

(22) Filed: Mar. 21, 2005

(65) Prior Publication Data

US 2005/0163213 A1 Jul. 28, 2005

Related U.S. Application Data

(63) Continuation of application No. PCT/JP03/05311, filed on Apr. 24, 2003.

(51) Int. Cl.
*H04N 7/12* (2006.01)
*H04N 11/02* (2006.01)
*H04N 11/04* (2006.01)

(52) U.S. Cl.
USPC .................................. 375/240.01

(58) Field of Classification Search .............. 375/240.01
See application file for complete search history.

(56) References Cited

U.S. PATENT DOCUMENTS

| | | | | |
|---|---|---|---|---|
| 4,635,112 A | * | 1/1987 | Tomioka et al. | 380/201 |
| 6,094,521 A | * | 7/2000 | Okayama et al. | 386/44 |
| 6,909,763 B2 | * | 6/2005 | Matsubayashi | 348/700 |
| 6,944,221 B1 | * | 9/2005 | Keesman | 375/240.02 |
| 6,947,487 B2 | * | 9/2005 | Choi et al. | 375/240.25 |

FOREIGN PATENT DOCUMENTS

| | | |
|---|---|---|
| JP | 8-032586 | 2/1995 |
| JP | 08-241217 | 9/1996 |
| JP | 11-027320 | 1/1999 |
| JP | 11-096128 | 4/1999 |
| JP | 11-262005 | 9/1999 |
| JP | 2000-115665 | 4/2000 |
| JP | 2001-320420 | 11/2001 |
| JP | 2002-033712 | 1/2002 |
| JP | 2002-300177 | 10/2002 |

OTHER PUBLICATIONS

Naoya Ikeda et al.; An Architecture of Hierarchic Load Balanced Contents Delivery System; Proceedings of the 2002 IEICE General Conference; Mar. 27-30, 2002; Waseda University, Tokyo.

* cited by examiner

*Primary Examiner* — Mehrdad Dastouri
*Assistant Examiner* — Jeremaiah C Hallenbeck-Huber
(74) *Attorney, Agent, or Firm* — Fujitsu Patent Center

(57) ABSTRACT

An image encoder which attaches information unique to a frame to encoded moving-image data. An encoding unit compressively encodes moving-image data so as to produce pictures. First numbers respectively corresponding to the above pictures are obtained by counting the pictures. Frame information items unique to individual frames in the moving-image data are held in association with the first numbers, respectively. A header-information insertion unit receives ones of the above pictures, and inserts header information items into data of the ones of the pictures. Second numbers respectively corresponding to ones of the pictures are obtained by counting the ones of the pictures. The header-information insertion unit inserts one of the frame information items held in association with one of the first numbers identical to each of the second numbers, into a header information item corresponding to a predetermined portion of data of a picture which corresponds the second number.

10 Claims, 5 Drawing Sheets

| Byte | Data |
|---|---|
| 1 | 0 : When No Scene Change Occurs<br>1 : When Scene Change Occurs |
| 2 | Number of Pictures (Bits 31 to 24) |
| 3 | Number of Pictures (Bits 23 to 16) |
| 4 | Number of Pictures (Bits 15 to 8) |
| 5 | Number of Pictures (Bits 7 to 0) |
| 6<br>⋮<br>16 | 0xFF |

FIG. 5

IMAGE ENCODER AND IMAGE ENCODING METHOD

CROSS-REFERENCE TO RELATED APPLICATIONS

This application is a continuing application, filed under 35 U.S.C. Section 111(a), of International Application PCT/JP2003/005311, filed Apr. 24, 2003.

BACKGROUND OF THE INVENTION

1) Field of the Invention

The present invention relates to an image encoder and an image encoding method for encoding moving images, and in particular to an image encoder and an image encoding method which can attach information unique to a frame (e.g., information indicating a scene change) to encoded data.

2) Description of the Related Art

In recent years, it has become common practice to handle moving images in a form of digital data by using compressive encoding such as MPEG (Moving Picture Expert Group). Such digital data representing moving images (moving-image data) are used for recording the moving images in various recording mediums or transmitting the moving images through networks. Conventionally, scene-change information indicating a time at which a record of an image starts or scenes are changed is attached to the moving-image data. For example, when a moving image is reproduced based on moving-image data, the scene-change information is used in a search for a time at which scenes are changed, generation of a thumbnail image, or the like.

For example, Japanese Unexamined Patent Publication No. 2000-115665 (Paragraphs [0014] to [0032] and FIG. 1) discloses an image-recording device which can detect a scene change from moving-image data, and attach scene-change information to the data. In the disclosed image-recording device, a buffer memory holds data for two precedingly inputted frames at all times, a scene-change detection circuit detects whether or not a scene change occurs, based on the current frame and the two precedingly inputted frames, and a scene-change attachment circuit attaches information indicating a scene change to system information when a scene change is detected. In addition, a switch selectively outputs one of the data to which the information indicating a scene change is attached and data to which information indicating a scene change is not attached, according to whether or not a scene change occurs.

In addition, recently, use of devices for compressively encoding image signals and recording the encoded image signals in a recording medium such as an optical disk has widely spread, where the image signals are, for example, television image signals received through an antenna or image signals inputted externally. In such devices, attachment of scene-change information is being considered. For example, in the devices which perform compressive MPEG encoding, a frame memory temporarily stores inputted image signals, and an encoding unit successively reads and compressively encodes the temporarily stored image signals frame by frame or field by field so as to produce a video stream. Finally, a multiplex unit multiplexes the video stream and an audio stream and the like so as to produce an MPEG stream, which is then recorded in a recording medium.

In order to attach scene-change information during generation of an MPEG stream, it is possible to detect presence or absence of a scene change based on the data stored in a frame memory in a preceding stage in the encoding unit, and record, by the multiplex unit, information indicating the scene change in an option field or the like in a header.

However, since the MPEG technique uses the variable-length encoding, the amount of data of the video stream generated per unit time is variable, the timings of the multiplexing of respective frames are not periodical. Therefore, when the scene change is detected and the scene-change information is recorded in the above manner, the time taken from the detection of the scene change to the recording of the scene-change information irregularly fluctuates, and thus it is difficult to accurately insert the scene-change information in a header of a packet containing a leading portion of data for an objective frame at which a scene change occurs.

SUMMARY OF THE INVENTION

The present invention is made in view of the above problems, and a first object of the present invention is to provide an image encoder which can attach frame information unique to a frame (such as scene-change information) to encoded data of a moving image at an accurate position.

A second object of the present invention is to provide an image encoding method which can attach frame information unique to a frame (such as scene-change information) to encoded data of a moving image at an accurate position.

In order to accomplish the first object, an image encoder for encoding moving images is provided. The image encoder comprises: an encoding unit which compressively encodes moving-image data so as to produce pictures; a first counter which counts the pictures produced by the encoding unit so as to obtain first numbers respectively corresponding to the pictures; a frame-information holding unit which holds frame information items unique to individual frames in the moving-image data, in association with the first numbers, respectively; a header-information insertion unit which receives ones of the pictures produced by the encoding unit, and inserts header information items into data of the ones of the pictures; and a second counter which counts the ones of the pictures received by the header-information insertion unit so as to obtain second numbers respectively corresponding to the counted ones of the pictures. The header-information insertion unit refers to the frame-information holding unit, and inserts one of the frame information items held in the frame-information holding unit in association with one of the first numbers identical to each of the second numbers, into one of the header information items corresponding to a predetermined portion of data of a picture which corresponds the second number.

In order to accomplish the second object, an image encoding method for encoding moving images is provided. The image encoding method comprises the steps of: (a) compressively encoding moving-image data so as to produce pictures; (b) counting the pictures produced in the step (a) so as to obtain first numbers respectively corresponding to the pictures; (c) holding frame information items unique to individual frames in the moving-image data, in association with the first numbers, respectively; and (d) inserting header information items into data of the pictures produced in the step (a). The step (d) includes the substeps of: (d1) receiving ones of the pictures produced in the step (a) for insertion of the header information items; (d2) counting the ones of the pictures received in the step (d1) so as to obtain second numbers respectively corresponding to the ones of the pictures received in the step (d1); and (d3) inserting one of the frame information items held in the step (c) in association with one of the first numbers identical to each of the second numbers, into one of the header information items corresponding to a predetermined portion of data of a picture which corresponds to the second number.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 5 is a diagram illustrating an exemplary format of a header field in which scene-change information is inserted.

DESCRIPTION OF THE PREFERRED EMBODIMENTS

An embodiment of the present invention is explained below with reference to drawings.

Figure 1:
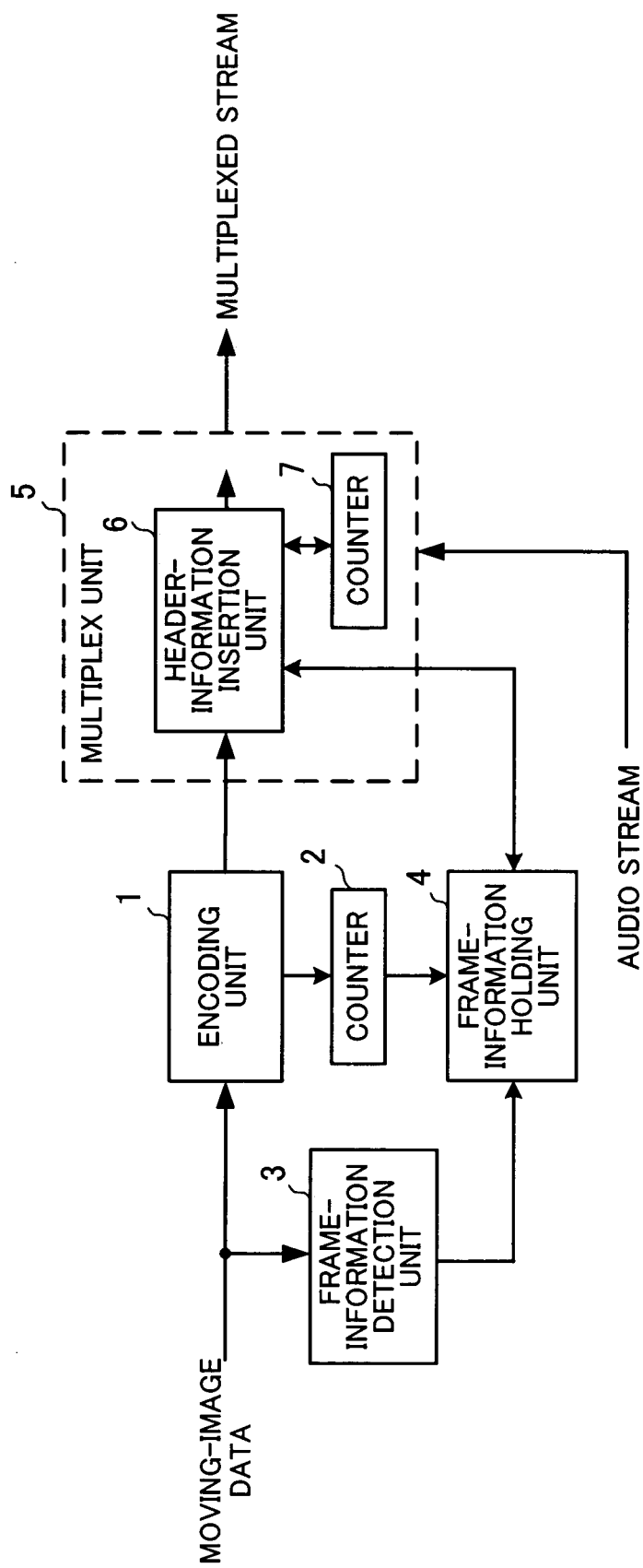
FIG. 1 is a diagram illustrating an example of an image encoder used for explaining the principle of the present invention.

FIG. 1 is a diagram illustrating an example of an image encoder used for explaining the principle of the present invention. In the image encoder of FIG. 1, moving-image data can be encoded so as to produce to a moving-image stream, and the moving-image stream is multiplexed with, for example, an audio stream before being outputted. The image encoder of FIG. 1 comprises an encoding unit 1, a first counter 2, a frame-information detection unit 3, a frame-information holding unit 4, and a multiplex unit 5. The multiplex unit 5 comprises a header-information insertion unit 6 and a second counter 7.

The encoding unit 1 compressively encodes moving-image data in accordance with a predetermined encoding procedure, and produces a moving-image stream, in which data for each frame or field are encoded so as to produce a picture.

The first counter 2 counts the pictures produced by the encoding unit 1. The counted number is stored in the frame-information holding unit 4.

The frame-information detection unit 3 detects frame information items from the moving-image data. Each frame information item is information which is unique to a frame and contained in the moving-image data. For example, the frame information items may include information indicating occurrence of a scene change in a corresponding frame, VBI (Vertical Blanking Interval) information inserted in a VBI, and the like. In the case where a frame memory for temporarily holding moving-image data is arranged in the input stage of the encoding unit 1, the frame information items can be detected from the data held in the frame memory.

The frame-information holding unit 4 stores each frame information item detected by the frame-information detection unit 3 in association with the number which is counted by the first counter 2 at the time of the detection of the frame information item.

The multiplex unit 5 multiplexes the moving-image stream produced by the encoding unit 1 and an audio stream in which audio (sound) data are encoded, so as to produce a multiplexed stream. The header-information insertion unit 6 in the multiplex unit 5 inserts predetermined header information in the moving-image stream received from the encoding unit 1.

The second counter 7 counts pictures in the moving-image stream which are received by the header-information insertion unit 6, and outputs the counted number to the header-information insertion unit 6.

The header-information insertion unit 6 refers to the frame-information holding unit 4 before the insertion of the header information, and acquires a frame information item associated with a number which is counted by the first counter 2 and identical to the number which is currently counted by the second counter 7. Then, the header-information insertion unit 6 inserts the acquired frame information item in header information corresponding to a leading portion of data of a picture which the header-information insertion unit 6 receives at this time. For example, the acquired frame information is written in a packet header of a packet which contains the leading portion of the data of the picture.

The operations of the image encoder having the construction as described above are explained below.

When moving-image data are inputted into the image encoder of FIG. 1, the moving-image data are compressively encoded into a moving-image stream by the encoding unit 1, and the moving-image stream is supplied to the multiplex unit 5. In the multiplex unit 5, header information is inserted into the moving-image stream by the header-information insertion unit 6, and the moving-image stream is multiplexed with an audio stream so as to produce a multiplexed stream, which is then outputted from the image encoder.

In addition, frame information items are detected by the frame-information detection unit 3 from the moving-image data inputted into the encoding unit 1, and stored in the frame-information holding unit 4 in association with the corresponding numbers which are obtained as count values by the first counter 2 at the times at which the respective frame information items are detected. Thus, it is possible to hold information indicating the correspondence between each frame information item and a picture corresponding to a frame for which the frame information item is detected.

Since the first counter 2 counts pictures produced by the encoding unit 1, and the second counter 7 counts pictures which the header-information insertion unit 6 receives, a picture corresponding to a number counted by the first counter 2 and a picture corresponding to a number counted by the second counter 7 are identical when the number counted by the first counter 2 is identical to the number counted by the second counter 7. Therefore, it is possible to definitely acquire a frame information item corresponding to a picture which the header-information insertion unit 6 receives, by acquiring a frame information item stored in association with a number identical to the number which is counted by the second counter 7 at the time the header-information insertion unit 6 receives the picture.

For example, when the header-information insertion unit 6 receives each picture from the encoding unit 1, the header-information insertion unit 6 recognizes a leading portion of the picture, increments the count in the second counter 7, and acquires a frame information item by using the incremented count, so that the header-information insertion unit 6 can easily insert the acquired frame information item in the field of header information corresponding to the leading portion of data of the picture. Therefore, in the multiplexed stream, it is possible to make the position in which the frame information is inserted accurately correspond to the position in which the data of the picture corresponding to the frame information are inserted. Thus, when an image is reproduced from the multiplexed stream, it is possible to extract and use the frame information items at accurate times synchronized with the reproduced image.

Hereinbelow, an embodiment of the present invention is explained in detail. In the following explanations, the present invention is applied to an apparatus which encodes an inputted video signal in accordance with the MPEG2 standard, and attaches information indicating a scene change as frame information to the encoded signal.

Figure 2:
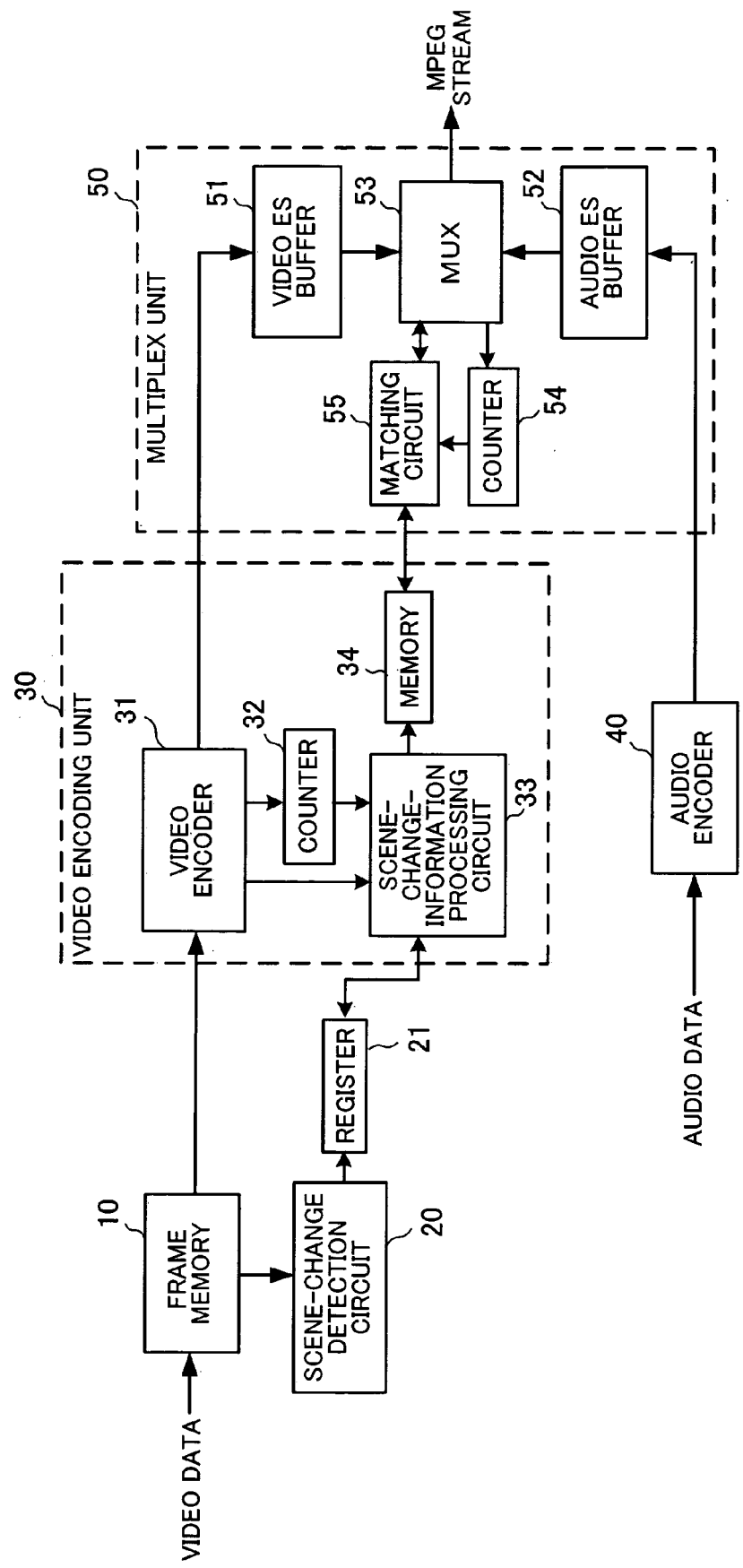
FIG. 2 is a block diagram illustrating the construction of an MPEG encoder according to an embodiment of the present invention.

FIG. 2 is a block diagram illustrating the construction of an MPEG encoder according to an embodiment of the present invention.

The MPEG encoder illustrated in FIG. 2 compressively encodes video data and audio data inputted into the image encoder, in accordance with the MPEG2 standard, and produces an MPEG stream. The MPEG encoder comprises a frame memory 10, a scene-change detection circuit 20, a video encoding unit 30, an audio encoder 40, and a multiplex unit 50.

The video and audio signals inputted into the MPEG encoder are analog signals, and supplied from an external device such as a television tuner. For example, the inputted video signal is in the form of a composite signal. In this case, the composite signal are separated into a luminance signal and color-difference signals by a Y/C separator (not shown), and the luminance signal and color-difference signals undergo A/D (analog-to-digital) conversion and chroma encoding by an NTSC (National Television System Committee) decoder (not shown), so that digital data are produced and stored in the frame memory 10.

The frame memory 10 is a buffer memory which has capacity for storing data for a plurality of frames, and operates in the FIFO mode so as to temporarily and successively store video data. The data stored in the frame memory 10 can be read out by a video encoder 31 and the scene-change detection circuit 20.

When video data for a first frame are read out from the frame memory 10 by the video encoder 31, the scene-change detection circuit 20 detects presence or absence of a scene change based on the data for the first frame and data for a second frame preceding the first frame, where the second frame is a frame the data for which have been stored in the frame memory 10 precedently to the first frame. For example, the scene change can be detected by either of the following methods. According to the first method, pixel values belonging to the above first and second frames are statistically processed, and the difference between the frames is obtained. According to the second method, a correlation coefficient between the frames is obtained. In these methods, the pixel values may represent only one of the luminance signal or the color difference signals. In addition, the scene-change detection circuit 20 comprises a register 21, and stores in the register 21 information indicating presence or absence of a scene change, based on the above difference or correlation coefficient.

The video encoding unit 30 comprises a video encoder 31, a counter 32, and a scene-change-information processing circuit 33. The video encoder 31 reads the video data stored in the frame memory 10, frame by frame, MPEG2 encodes the video data so as to produce pictures, and outputs to the multiplex unit 50 a video ES (Elementary Stream) containing the pictures. In addition, the video encoder 31 increments the count of the counter 32 every time a picture is produced, and informs the scene-change-information processing circuit 33 of the production of the picture.

The counter 32 counts the pictures generated by the video encoder 31, and outputs the incremented count to the scene-change-information processing circuit 33. When the scene-change-information processing circuit 33 receives the information on the production of the picture from the video encoder 31, the scene-change-information processing circuit 33 acquires the incremented count of the counter 32, determines presence or absence of a scene change by referring to the register 21 in the scene-change detection circuit 20, and stores in a memory 34 information indicating the presence or absence of a scene change as well as the acquired count. The memory 34 stores a table indicating a correspondence between each value of the count of the counter 32 and information indicating presence or absence of a scene change. Alternatively, the counter 32 may be arranged to successively store only the values of the count of the counter 32 corresponding to a frame in which a scene change occurs.

On the other hand, the analog audio signal inputted into the MPEG encoder is converted into digital audio data by an A/D converter (not shown), and the digital audio data are supplied to the audio encoder 40. The audio encoder 40 compressively encodes the audio data in accordance with the MPEG audio standard so as to produce an audio ES, which is supplied to the multiplex unit 50.

The multiplex unit 50 comprises a video ES buffer 51, an audio ES buffer 52, a multiplexer (MUX) 53, a counter 54, and a matching circuit 55.

The video ES buffer 51 and the audio ES buffer 52 are buffer memories which operate in the FIFO mode. The video ES buffer 51 temporarily stores data supplied from the video encoder 31, and successively outputs the stored video data to the multiplexer 53. The audio ES buffer 52 temporarily stores data supplied from the audio encoder 40, and successively outputs the stored audio data to the multiplexer 53.

The multiplexer 53 successively reads out the data from the video ES buffer 51 and the audio ES buffer 52, and multiplexes the data so as to produce a MPEG stream. In the operation of multiplexing the data, predetermined system information is inserted in a header field. In addition, when a leading portion of a picture is read out from the video ES buffer 51, the multiplexer 53 increments the counter 54, and informs the matching circuit 55 of the readout of the picture. Further, the multiplexer 53 receives from the matching circuit 55 a result of determination as to whether or not a scene change occurs in the picture, and inserts scene-change information corresponding to the result of determination in a header of a packet which contains the leading portion of data of the picture.

The counter 54 counts pictures which are read out from the video ES buffer 51 by the multiplexer 53, and outputs the count value to the matching circuit 55. When the matching circuit 55 receives a control signal for notification of readout of a picture from the multiplexer 53, the matching circuit 55 refers to the memory 34 based on the count of the counter 54, determines whether or not a scene change occurs in a frame corresponding to the above count value of the counter 54, and informs the multiplexer 53 of the result of this determination.

The basic operations of the above MPEG encoder are as follows.

That is, video data inputted into the MPEG encoder are successively stored in the frame memory 10. In the frame memory 10, a picture type is assigned to each frame in the stored video data, and data for each frame are read out by the video encoder 31 in order of encoding. The video encoder 31 encodes the data for each frame so as to produce a picture, inserts the encoded data of the picture in packets constituting a video ES, and sequentially outputs the video ES.

The video ES produced as above is temporarily stored in the video ES buffer 51, and sequentially read out by the multiplexer 53. In addition, an audio ES produced by the audio encoder 40 is temporarily stored in the audio ES buffer 52, and sequentially read out by the multiplexer 53. The multiplexer 53 inserts predetermined system information in the video ES and the audio ES, and multiplexes the video ES and the audio ES so as to produce and output an MPEG stream. At this time, the multiplexer 53 inserts scene-change information generated based on the result of the determination by the matching circuit 55, in an option field of a header of a video packet.

Next, processing for inserting scene-change information in an MPEG stream is explained in detail.

First, occurrence of a scene change is detected by the scene-change detection circuit 20 based on video data stored in the frame memory 10. As described before, data for each frame are read out from the frame memory 10 by the video encoder 31 in order of encoding. Every time data for a frame are read out by the video encoder 31, the scene-change detection circuit 20 detects presence or absence of a scene change based on the data for the frame and data for a preceding frame, and stores a result of the detection in the register 21.

In the video encoding unit 30, every time data for a frame are read out from the frame memory 10 by the video encoder 31, and a picture is produced, the count of the counter 32 is incremented, and the scene-change-information processing circuit 33 refers to the register 21, determines whether or not a scene change occurs, and writes in the memory 34 information corresponding to the result of the determination.

Figure 3:
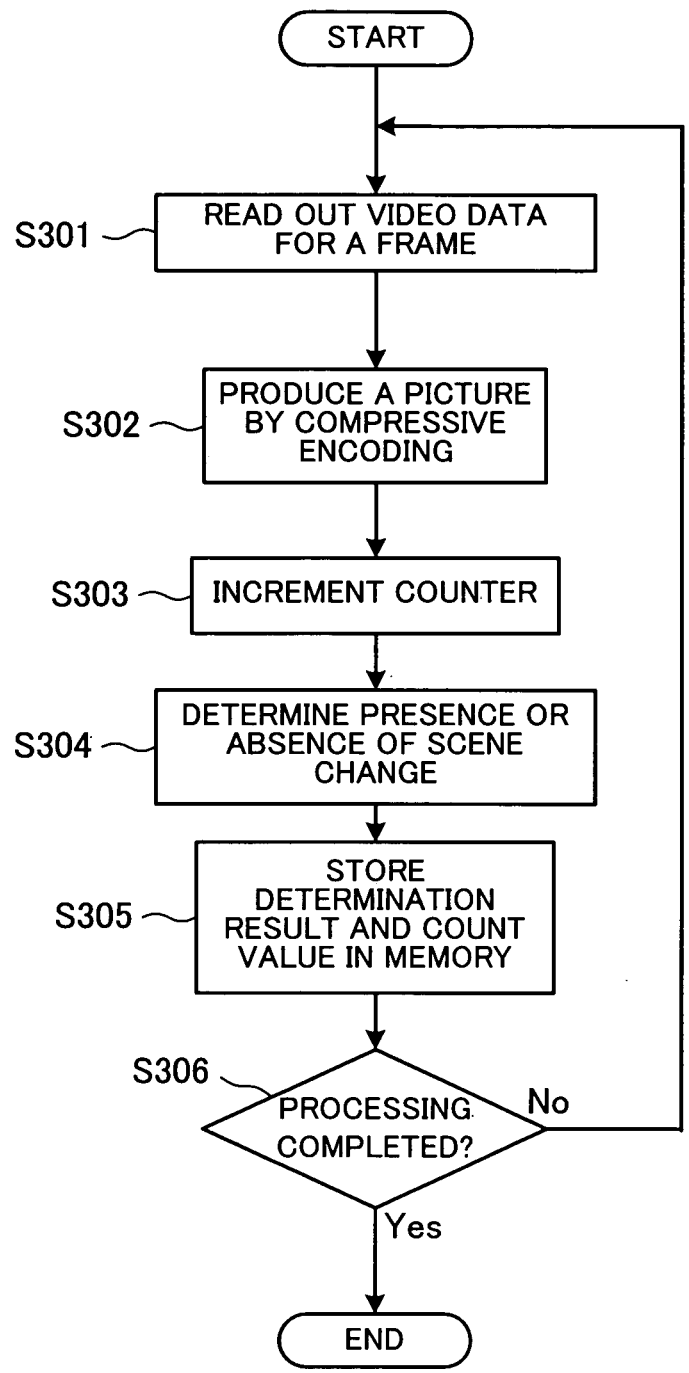
FIG. 3 is a flow diagram indicating a sequence of processing performed by a video encoding unit.

FIG. 3 is a flow diagram indicating a sequence of processing performed by the video encoding unit 30. The sequence of FIG. 3 is explained below step by step.

In step S301, the video encoder 31 reads out video data for a frame from the frame memory 10. In step S302, the video data are compressively encoded in accordance with the MPEG2 standard so as to produce a picture. The data of the picture is temporarily stored in an output buffer (not shown), and is then outputted to the video ES buffer 51 in the multiplex unit 50.

In step S303, the count of the counter 32 is incremented in accordance with a control signal supplied from the video encoder 31. In addition, in step S304, the scene-change-information processing circuit 33 determines whether or not a scene change occurs, by referring to the register 21. In step S305, the scene-change-information processing circuit 33 stores the result of the determination in association with the values of the count of the counter 32 in the memory 34.

In step S306, it is determined whether or not the processing of FIG. 3 is completed. When no is determined, the operation goes to step S301, and video data for the next frame are read out, and compressively encoded.

Through the above processing, information indicating whether or not a scene change occurs in each picture produced by the video encoder 31 and the count value associated with the picture are stored in the memory 34. On the other hand, in the multiplex unit 50, the pictures read out from the video ES buffer 51 by the multiplexer 53 are counted by the counter 54, and the obtained count value is compared with the count values stored in the memory 34. Thus, it is possible to easily recognize whether or not a scene change occurs in each picture read out from the video ES buffer 51.

Figure 4:
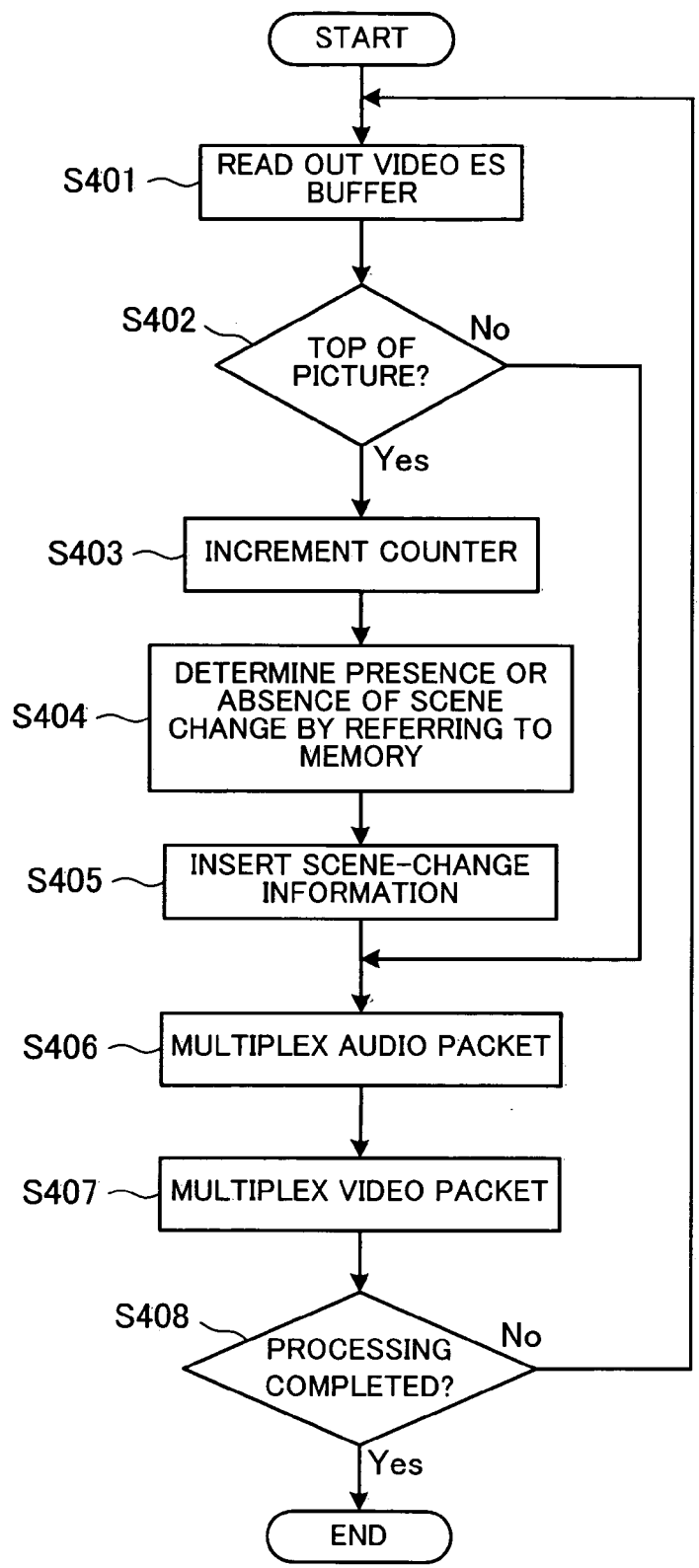
FIG. 4 is a flow diagram indicating a sequence of processing performed by a multiplex unit.

FIG. 4 is a flow diagram indicating a sequence of processing performed by the multiplex unit 50. The sequence of FIG. 4 is explained below step by step.

In step S401, the multiplexer 53 reads out data stored in the video ES buffer 51, for example, by unit amounts corresponding to PES (Packetized Elementary Stream) packets. In step S402, the multiplexer 53 determines whether or not the data read out from the video ES buffer 51 contains a leading portion of data of a picture. This determination can be made by reading a picture start code, which is indicated in a picture-layer header. When the data read out from the video ES buffer 51 contains a leading portion of data of a picture, the operation goes to step S403. When the data read out from the video ES buffer 51 does not contain a leading portion of data of a picture, the operation goes to step S406.

In step S403, the count of the counter 54 is incremented in accordance with a control signal supplied from the multiplexer 53. In step S404, the matching circuit 55 refers to data stored in the memory 34, reads information which is stored in the memory 34 in association with a count value of the counter 32 which is identical to the count value of the counter 54, determines whether or not a scene change occurs, and informs the multiplexer 53 of the result of the determination. In step S405, the multiplexer 53 inserts scene-change information in an option field of a header of a PES packet. The position in which the scene-change information is inserted is explained later with reference to FIG. 5.

In step S406, the multiplexer 53 produces an audio packet by using data read out from the audio ES buffer 52, and multiplexes the audio packet with the other signal(s) to be outputted. In step S407, the multiplexer 53 produces a video packet by inserting other necessary system information in a predetermined header field, and multiplexes the video packet with the other signal (s) to be outputted. In step S408, it is determined whether or not processing is completed. When no is determined, the operation goes to step S401, and the data read out from the video ES buffer 51 are processed by the multiplexer 53.

When the above processing is performed, an MPEG2 system stream to which scene-change information is attached is sequentially outputted from the multiplexer 53.

FIG. 5 is a diagram illustrating an exemplary format of a header field in which scene-change information is inserted.

In the multiplex processing performed by the multiplexer 53, the data read out from the video ES buffer 51 are inserted in a PES packet. In addition, in each PES packet which contains in its payload a leading portion of data for a frame, the header field is extended, and a 16-byte option field called a PES private data field is arranged in the extended field as well as a field for recording a time stamp and the like. Therefore, when the scene-change information is inserted in the option field, it is possible to accurately extract the scene-change information in synchronization with the reproduction timing of the picture when the picture is reproduced.

According to the present embodiment, in the PES private data field, the number of pictures counted by the counter 54 is also recorded as well as the information indicating presence or absence of a scene change. For example, the information indicating presence or absence of a scene change is recorded in the first byte of the PES private data field. In this field, "1" is written when a scene change occurs, and "0" is written when a scene change does not occur. In addition, in the second to fifth bytes of the PES private data field, information indicating what number from the start of the encoding the picture is is recorded with 32-bit data. This information is indicated by the count value of the counter 54.

In the MPEG encoder described above, the information indicating presence or absence of a scene change is stored in the memory 34 in association with each picture produced by the video encoder 31. In addition, in the multiplex unit 50, the number of pictures is counted at the time of the multiplexing, the presence or absence of a scene change in each picture is determined by referring to the memory 34 and comparing the value counted in the multiplex unit 50 with the values stored in the memory 34, and the scene-change information corresponding to the result of the determination is inserted in the multiplexed stream.

That is, since the presence or absence of a scene change is recognized on a picture-by-picture basis, the multiplexer 53 can accurately insert the scene-change information in the output of the multiplexer 53 in synchronization with the multiplexing of the picture data, and the position in which the scene-change information is inserted is not apart from the leading position of the picture. Further, since the scene-change information is inserted in the PES private data field, it is possible to easily and accurately secure synchronization between the picture and the scene-change information. Therefore, it is possible to accurately extract the time at which a scene change occurs when reproduction from on a produced MPEG stream is made. For example, the operations of access to the start of each scene, generation of a thumbnail, and the like can be performed in accurate synchronization with the reproduced image.

It is possible to modify the above embodiment of the present invention within the scope of the present invention as follows.

(1) Although, in the described embodiment, video data are encoded on a frame-by-frame basis, video data may be encoded on a field-by-field basis. In this case, it is possible to detect a scene change based on data of a first field newly read out from the frame memory by the video encoder and data of a second field which are stored two frames in advance of the first frame in the frame memory.

(2) Although, in the described embodiment, presence or absence of a scene change is detected on a picture-by-picture basis, the presence or absence of a scene change may be detected on a GOP-by-GOP basis. (The GOP is the Group of Pictures.) In this case, every time the leading picture of a GOP is produced, the video encoder increments the count, and writes in a memory the count and information indicating presence or absence of a scene change. In addition, when the multiplex unit multiplexes the leading picture of the GOP, the multiplex unit determines presence or absence of a scene change by referring to the above memory. Further, scene-change information is inserted in a PES packet which contains a GOP header. In such a case, sometimes the position in which the scene-change information is inserted is delayed several frames from the position at which a scene change actually occurs. However, it is possible to determine the position at which a scene change actually occurs, by using the function of locating the start of a sequence, which the conventional MPEG2 reproducing devices have.

(3) In the case where operations of starting and stopping recording are repeated by a user, or a plurality of programs are timer recorded, or in other similar cases, when scene-change information is inserted at the time a recording sequence is newly started, the time at which the recording sequence is started can be extracted. When the scene-change information is used for the above purpose, for example, it is sufficient to insert the scene-change information in a user data field immediately following a sequence header.

(4) In the case of an encoder in accordance with the MPEG1 standard, when a private packet containing scene-change information is inserted in a position of the multiplexed output immediately preceding the position at which the leading portion of data for a frame is inserted, it is possible to accurately extract the position at which a scene change occurs, during reproduction.

As explained above, in the image encoder according to the present invention, frame information corresponding to a produced picture can be acquired by referring to the frame-information holding unit when header information is inserted in encoded data. Therefore, the frame information can be inserted in the header information corresponding to a leading portion of data of the picture with reliability, and the position at which the frame information is inserted does not deviate from an appropriate position.

In addition, in the image encoding method according to the present invention, frame information items are stored in advance in association with the aforementioned first numbers of produced pictures, and frame information corresponding to a produced picture can be acquired by comparing the aforementioned second number of the picture with the first numbers when header information is inserted in encoded data. Therefore, the frame information can be inserted in the header information corresponding to a leading portion of data of the picture with reliability, and the position at which the frame information is inserted does not deviate from an appropriate position.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image encoder for encoding moving images, comprising:
    an encoder which compressively encodes moving-image data so as to produce pictures and outputs the pictures to a buffer;
    a first counter which counts the pictures produced by said encoding unit so as to obtain first numbers respectively corresponding to the pictures;
    a frame-information memory which holds frame information items unique to individual frames in said moving-image data, in association with said first numbers, respectively;
    a header-information insertion circuit which receives the pictures produced by said encoder from the buffer, and inserts a header information item into data of each of the pictures;
    a second counter which counts the pictures received from the buffer by the header-information insertion circuit and outputs second numbers each one corresponding to each of the pictures;
    a scene-change detection circuit which detects presence or absence of a scene change based on frame data or field data and outputs scene-change information;
    a scene-change information processing circuit which associates the scene-change information with one of the first numbers and stores the scene-change information and the one of the first numbers in the frame-information memory; and
    a matching circuit which receives one of the second numbers, refers to the scene change information, which corresponds to the first number identical to the received one of the second numbers, in the frame-information memory to determine whether or not a scene change occurs at a picture corresponding to the received one of the second numbers and outputs from the frame-information memory the scene-change information,
    wherein, when the header-information insertion circuit receives the picture from the buffer, the matching circuit receives the second number from the second counter and outputs from the frame-information memory the scene-change information which corresponds to the first number identical to the received second number, and the header-information insertion circuit inserts the scene-change information from the matching circuit into the data of the received picture.

2. The image encoder according to claim 1, further comprising
a frame-information detection circuit which detects said frame information items from said moving-image data, and said frame-information memory acquires the frame information items detected by the frame-information detection circuit.

3. The image encoder according to claim 1, wherein at least one of said frame information items includes information indicating that a scene change occurs in a frame corresponding to each of the at least one of the frame information items.

4. The image encoder according to claim 1, further comprising,
a flame memory to temporarily store said moving-image data,
said frame-information memory recognizes occurrence of a scene change based on a detection signal outputted from said scene-change detection circuit.

5. The image encoder according to claim 4,
wherein said encoder produces a picture by performing compressive encoding when the encoder reads out data for each frame or field from said memory, and
said scene-change detection circuit detects presence or absence of a scene change in each frame or field on which said compressive encoding is to be performed when the encoder reads out from said memory data for said each frame or field.

6. The image encoder according to claim 1, wherein said frame information items include information which is inserted in a vertical blanking interval in each frame in said moving-image data.

7. The image encoder according to claim 1, further comprising a multiplexer which includes said header-information insertion circuit and multiplexes the moving-image stream including data of the pictures in which the header information items are inserted based on said first numbers and said second numbers with another data stream.

8. An image encoding method for encoding moving images by an encoder, comprising:
compressively encoding moving-image data so as to produce pictures and outputting the pictures to a buffer;
counting the pictures so as to obtain first numbers respectively corresponding to the pictures;
holding frame information items unique to individual frames in said moving-image data, in association with said first numbers, respectively, into a frame information memory;
multiplexing a moving-image stream including with another data stream;
inserting one of header information items based on said first numbers and second numbers into data of each of the pictures,
receiving the pictures from the buffer for insertion of the header information items,
counting the pictures received from the buffer for insertion of the header information items and outputting said second numbers each one corresponding to each of the pictures received,
detecting presence or absence of a scene change based on frame data or field data and outputs scene-change information,
associating the scene-change information with one of the first numbers and storing the scene-change information and the one of the first numbers in the frame-information memory,
receiving one of the second numbers,
referring to the scene change information, which corresponds to the first number identical to the received one of the second numbers, in the frame-information memory to determine whether or not a scene change occurs at a picture corresponding to the received one of the second numbers,
outputting from the frame-information memory the scene-change information, and
inserting the scene-change information into the data of a corresponding picture;
wherein, when the picture is received from the buffer, the referring receives the second number and outputs from the frame-information memory the scene-change information which corresponds to the first number identical to the received second number, and the inserting the scene-change information inserts the scene-change information which the referring outputs into the data of the received picture.

9. The image encoder according to claim 7, wherein said header-information insertion circuit inserts the header information items into data of the ones of the pictures corresponding to the moving-image stream when the multiplex unit multiplexes the moving-image stream with the another data stream.

10. The image encoding method according to claim 8, further comprising multiplexing a moving-image stream including the pictures with another data stream,
wherein the header information items are inserted into data of the pictures corresponding to the moving-image stream when the moving-image stream is multiplexed with the another data stream.

* * * * *